United States Patent
Juhue et al.

(10) Patent No.: US 7,488,784 B2
(45) Date of Patent: Feb. 10, 2009

(54) NOVOLAC ALKYLPHENOL RESIN FORMED WITH FATTY ACID

(75) Inventors: Didier Juhue, Chaponost (FR); Jean-Marc Sage, Oullins (FR)

(73) Assignee: SI Group, Inc., Schenectady, NY (US)

( * ) Notice: Subject to any disclaimer, the term of this patent is extended or adjusted under 35 U.S.C. 154(b) by 287 days.

(21) Appl. No.: 11/394,235

(22) Filed: Mar. 31, 2006

(65) Prior Publication Data

US 2007/0060718 A1 Mar. 15, 2007

(51) Int. Cl.
 *C08G 8/30* (2006.01)
 *C08G 8/32* (2006.01)
(52) U.S. Cl. ............. 525/508; 525/502; 528/158.5
(58) Field of Classification Search ............... None
 See application file for complete search history.

(56) References Cited

U.S. PATENT DOCUMENTS 2,891,021 A * 6/1959 Aelony .................. 525/54.42
6,326,453 B2 * 12/2001 Asami et al. ............. 528/141

FOREIGN PATENT DOCUMENTS

| JP | 58-220739 A | * | 12/1983 |
| JP | 11-349655 A | * | 12/1999 |
| JP | 2004-238618 A | * | 8/2004 |

OTHER PUBLICATIONS

HCAPLUS accession No. 1988:57118 for Czech Patent No. 238,995, Marek et al., Dec. 16, 1985, one page.*

* cited by examiner

*Primary Examiner*—Robert Sellers
(74) *Attorney, Agent, or Firm*—Nixon Peabody LLP; Jeffrey N. Townes

(57) ABSTRACT

The invention relates to novolac alkylphenol resins having a low level of free alkylphenol, a method for the production thereof, and the use thereof as tackifying resins and reinforcing resins for rubbers. The resins may be used advantageously in the production of tires.

26 Claims, 1 Drawing Sheet

NOVOLAC ALKYLPHENOL RESIN FORMED WITH FATTY ACID

This application claims priority to International Application No. PCT/FR2004/002495, filed Oct. 1, 2004, which claims priority to French Application No. 0311606, filed Oct. 3, 2003, both of which are herein incorporated by reference in their entirety.

FIELD OF THE INVENTION

The present invention relates to novolac alkylphenol resins used that can be used for tackifying resins or reinforcing resins for rubber compositions.

BACKGROUND

Novolac alkylphenol resins may be obtained by reacting alkylphenols such as para-tertiary butylphenol (PTBP) and para-tertiary octylphenol (PTOP) with aldehydes, especially formaldehyde, in the presence of acid catalysts. See Knop et al., "Chemistry and application of phenolic resins," *Polymer/ properties and Application*, ed. Springer-Verlag Berlin Heidelberg New York, p. 10-27 (1979), which gives an overview of the different aldehydes and alkylphenol monomers used in the novolac alkylphenol phenolic resins.

It is known that by varying the molar ratio (MR) of aldehydes(s)/alkylphenol(s), it is possible to prepare resins having different average molecular masses. However, due to the chemical nature of the reaction, a fraction of free phenolic monomers remains after the formaldehyde has been consumed at the end of the reaction. An estimation of the fraction of free phenols has been calculated by considering the formaldehyde/phenol as a statistical polycondensation. See Borrajo et al., *Polymer*, Vol. 23, February, p. 263-266 (1982). Borrajo et al. discuss that, according to Stokemayer's distribution, a reaction carried out with MR 0.7 yields a rate of residual phenol of 11.6%, a MR of 0.8 yields 6.5%, and a MR of 0.9 yields 3%; the calculation also describes MRs of 9, 4 and 1%, respectively, for a dysfunctional paraalkylphenol. Typically, the molar ratio used for production of commercial novolac alkylphenol resins varies from 0.7 to 0.9.

It is desirable to reduce this rate of residual phenolic monomer(s) for environmental reasons, on one hand, and to diminish the nature of dangers of resins. In fact, alkylphenols like PTOP are the object of environmental and toxicology studies (risk assessment studies) to limit their use in the free monomer form in novolac alkylphenol resins. The decrease in the free alkylphenol rate also permits a simpler manipulation of resins by decreasing the vapor emissions of alkylphenolic monomers in factories or in atmospheric discharges when they are used, in particular rubber applications when vulcanization is carried out at elevated temperature.

The commercial novolac alkylphenol resins used as tackifying resins in the formulation of rubber generally have a softening point temperature between 85 and 105° C. Since the usage temperature are dictated by complex components of the rubber-based formulations and cannot be modified easily without changing the reactivity of the system: the alkylphenolic resins in this softening point temperature range are suitable for allowing the dissolution, the fusion and the dispersion of the resin during its mixing step with the other components of the rubber formulation and at the time of the vulcanizing step.

Wolny et al., *Kautsuch Gummi Kunstoffe* [Rubber, Plastics] 37:7, p. 601-603 (1984) describes novolac resins from the condensation of the PTOP and formaldehyde that have a temperature close to 100° C. and have a residual free alkylphenol rate of about 4.5%. The MR, however, is about 0.8 to 0.9, and the resins have a softening point value of 85-110° C. A rate of free residual PTOP less than 1% could not be obtained without having a MR greater than 0.9 with a softening point temperature of around 120° C. For a novolac PTOP/ formol resin with MR 0.96, the rate of free PTOP is less than 1% and the softening point temperature is elevated (around 130-140° C.). In addition to the elevated temperatures (around 180° C.), the synthesis is delicate because of the significant viscosity of the resin. For resins with PTBP having high softening point temperatures (on the order of 120-130° C.) and a MR on the order of 0.8, the residual PTBP rate is observed to be around 2 to 3%.

The free residual monomer or monomers can be distilled at the end of the resin synthesis to decrease the rate of free alkylphenols. However, this conventional method presents several disadvantages: first, the distillation of the free monomer or monomers represents a not insignificant loss of primary material and requires recycling or treatment of the distilled alkylphenol; second, it is difficult to implement at the industrial level for the alkylphenols like PTOP that have very high boiling points, which involves a very powerful vacuum and elevated temperatures in the reactor in order. Besides that, alkylphenols that are solid compounds, like PTBP and PTOP, crystallize in the piping which requires reheating if plugs are to be prevented.

U.S. Pat. No. 6,326,453 and EP 1,108,734 A1 teach that the reduction in the rate of free phenol in novolac (alkyl)phenol resins can also be obtained by the use of an organophosphonic catalyst. However, a significant amount of catalyst is used. To arrive at a rate of residual free phenol less than 1%, it is necessary to use 60% by weight of organophosphonic catalyst, based on the weight of the phenol, and for a rate of residual phenol of around 2%, it is necessary to use 10% by weight of catalyst. These references also indicated that as the rate of catalyst becomes lower, with 0.1 mol-% in comparison to the phenol, the reaction becomes ineffective.

JP11-349.655 describes the preparation of novolac phenol-formol resins in a methanol solution under supercritical conditions of 15 MPa/250° C. to obtain a rate of free phenol of 1%. This type of procedure is very difficult to implement on the industrial level because of the elevated pressures necessary, as it is preferable to work at pressures close to atmospheric pressure.

The addition of urea is recommended by Li Ziqiang, *Mining & Metallurgy*, Vol. 5, No. 1, p. 24-27 (March 1996) (CAS 125:115938). According to the Ziqiang, this makes it possible to decrease the free phenol from 18% (without urea) to 5%. But this is still too high. Besides that, the introduction of urea into the product involves the risk of deteriorating the stability of the phenolic resin and thus negatively effecting the final properties of the resulting rubber formulations.

CS 238.995 (CAS 108:57118) describes the preparation of a mixture made up of phenol, formaldehyde (MR 0.97), and stearic acid (3.5% by weight based on the phenol) in the presence of various additives or batches. The resin obtained after reaction of the mixture has a rate of free phenol of 5%.

U.S. Pat. Nos. 2,506,903 and 2,506,904 teach the preparation of greases (which have a softening point value that is close to or less than the ambient temperature) obtained by esterification of a novolac formophenolic resin with fatty acids, the formol/alkylphenol ratio MR described in the application varies from 1 to 2. The preparation process consists either of (a) esterifying the alkyl phenol with the fatty acid near 100° C., which is reacted with formaldehyde at temperatures up to 250° C., or (b) preparing the formaldehyde/alkylphenol resin at a temperature of 100-150° C., then to adding fatty acid to carry out the esterification reaction at a temperature of 200° C. The rate of fatty acid necessary to obtain a product in the form of grease is on the order of 100% of the alkylphenol mass used.

JP09-003.384 (CA/126:187493) describes the modification by esterification of a formophenolic resin of the resol type (prepared with a base catalysis) at a temperature greater than 200° C., typically between 200 and 260° C., with a fatty acid in the presence of rosin or one of its derivatives. The rate of residual phenolic monomer is less than or equal to 1%. This modified resin being used for the manufacture of printing ink.

Accordingly, no satisfying technical solution exists for decreasing the rate of residual alkylphenol(s) in the novolac alkylphenol resins below 2% while maintaining a softening point temperature between 85 and 105° C., so that the resins can be used as tackifying or reinforcing resins in rubber-based formulations. This invention answers that need.

SUMMARY OF THE INVENTION

One embodiment of the invention relates to a novolac alkylphenol resin, comprising 2-20% by weight based on the weight of the alkylphenol, of at least one saturated or unsaturated fatty acid. The resin has a rate of residual alkylphenol of less than 2% and a softening point temperature between 85-105° C.

Another embodiment of the invention relates to a process for preparing a novolac alkylphenol resin. The process includes (a) reacting an alkylphenol with an aldehyde to form a first resin, wherein the molar ratio of the alkylphenol:aldehyde is at least 0.9:1.0, and (b) mixing the first resin with at least one saturated or unsaturated fatty acid in a melted state, to form a novolac alkylphenol resin. The novolac alkylphenol resin has a residual alkylphenol of less than 2% and a softening point temperature between 85-105° C.

Another embodiment of the invention relates to a process for the preparing a novolac alkylphenol resin. The process includes condensing an aldehyde and an alkylphenol in the presence of at least one saturated or unsaturated fatty acid at a temperature of less than or equal to 200° C., to form a novolac alkylphenol resin. The novolac alkylphenol resin has a residual alkylphenol of less than 2% and a softening point temperature between 85-105° C.

DETAILED DESCRIPTION

Figure 1:
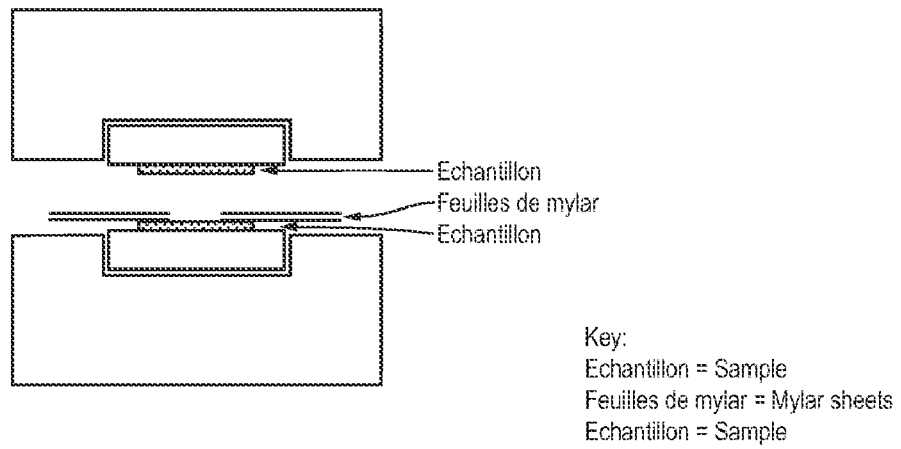
FIG. 1 illustrates a tack measurement assembly diagram.

An object of the invention is to produce a novolac alkylphenol resin having a residual rate of alkylphenol(s) of less than 2%, preferably less than or equal to 1.5%, and most preferably less than or equal to 1% while having a softening point temperature between 85 and 105° C., preferably between 95 and 105° C. The resins may be obtained using one or several alkylphenolic monomers, one or several aldehydes, and 2 to 20%, more preferably 5 to 10%, by weight based on the alkylphenol(s), of at least one saturated or unsaturated fatty acid.

The alkylphenols are phenols, preferably alkylated with a hydrocarbonated alkyl group in para position of the phenol group and having 6 to 10 carbon atoms. The use of a tertioctyl alkyl group, such as para-tertiary octylphenol, is the most preferred. In addition to the alkylphenolic monomers described above, the novolac resins can also contain other phenols. These other phenols can represent up to 30% of the total mass of the phenols of the resin. Suitable other phenols include phenol, resorcinol, cardanol, and dialkylphenols, such as dimethylphenols, xylenols, or 2,4 or 2,6-ditertiary octylphenols.

Any aldehyde is suitable. Preferably, the aldehyde is formol or formaldehyde.

The fatty acids may be saturated mono-carboxylic acids or mono-olefinics having at least 8 carbon atoms. Preferably, the saturated fatty acids have 8 to 32 carbon atoms. Suitable saturated fatty acids include caprylic, pelargonic, capric, undecylic, lauric, stearic and behenic acid. Suitable unsaturated fatty acids include oleic and undecylic acids. It is also possible to use synthetic or natural mixtures of these fatty acids, which can be obtained by saponification of vegetable oils or animal fats. Stearic acid is especially preferred.

Another object of the invention relates to a process for preparing a novolac alkylphenol resins. For the resins that contain formol, the formol is usually introduced into the reaction medium in the form of an aqueous solution; it can also be introduced in the form of paraformaldehyde.

The novolac resin can be prepared by synthesizing formophenolic resins of the novolac type with aldehydes/alkylphenol having a molar ratio greater than 0.9. A first resin with elevated softening point temperature (i.e. greater than 110° C.) is formed. The fatty acid or acids are then added while the resin is again in a melted state. The resin may be melted, either in the synthesis reactor or in the presence of the fatty acid or acids, which are agitated in order to mix it/them with in the resin in a homogeneous manner.

Alternatively, the condensation of the aldehydes or aldehydes may be carried out with the alkylphenol(s) in the presence of the fatty acid(s) at temperatures less than or equal to 200° C., preferably less than or equal to 180° C., most preferably less than or equal to 160° C. The preparation of the resin in a single step offers several advantages in comparison to the procedure described above, where the alkylphenol(s) and aldehydes(s) are condensed before being mixed with the fatty acid(s). First, the formation of a reaction medium with elevated viscosity in the reactor at the time of synthesis of the novolac resin is avoided or reduced. Second, the use of elevated temperature that is otherwise required or desirable in conventional techniques can also be avoided.

The preferred procedure described above can either be a procedure of the batch type or a continuous procedure in which alkylphenol(s), fatty acid(s) and aldehydes(s) are introduced continuously into the reactor or into a series of reactors. A description of continuous procedures can be found in Knop et al., "Chemistry and application of phenolic resins," *Polymer/properties and Application*, ed. Springer-Verlag Berlin Heidelberg, New York, p. 62-64 (1979), herein incorporated by reference in its entirety.

In general, the process may be carried out by introducing alkylphenol(s) and fatty acid(s) into the reactors, followed by the acid catalyst or catalysts into the reactors; the mixture is then brought to 80-100° C. at atmospheric pressure and the aldehydes or aldehydes are introduced to flow in over a period that varies from 15 to 100 minutes, the mixture being kept under agitation. When the aldehyde is formol, preferably a solution of formaldehyde in water is used and the medium is held at reflux until the formaldehyde is finished flowing in.

After the aldehyde or aldehydes have flowed in, the temperature of the medium is raised to 120-150° C. in order to distill the reaction water and any water that has been introduced with the aldehydes. The reactor is then placed under a slight vacuum (pressure of 0.2 to 0.6 bar, absolute) and a temperature of 140-160° C. for a period that can typically vary from around 30 to 400 minutes, depending on the size of the reactor used and the equipment used to produce the vacuum. The tracking of the softening point temperature value during this period makes it possible to determine the stopping point of the resin. It is then possible to add a base like sodium carbonate, soda, or amines, for example triethanolamine, to neutralize the catalyst. The addition of a base is not obligatory but makes it possible to better control the development of the resin in the reactor. The reactor is then discharged and the resin is obtained.

The catalysts used for synthesis of novolac resins may be any acid catalysts known to the person skilled in the art. Suitable catalysts include mineral or organic acids, alone or in a mixture, sulfuric acid that is pure or in solution in alcoholic solvents, phosphoric acid, oxalic acid or formic acid. The catalyst quantities used generally vary from 0.4 to 0.1%, based on the mass of alkylphenol(s).

Another object of the invention relates to the use of compounds as tackifying resins in the formulation in rubber. The novolac resins of the invention present the advantage of requiring little to no modification of the application conditions of the rubber formulation in which they are incorporated. Yet the resins remain as effective as conventional resins and have a lower rate of free alkylphenol monomers, thus a reduced emission of harmful alkylphenol compounds when they are used.

EXAMPLES

The following examples illustrate the invention
Determination of the Rate of Free Alkylphenol(s)
The determination of the rate of residual PTOP is carried out using vapor phases chromatography on a Hewlett Packard 5890 Series II chromatograph equipped with an injector/divider, a CPV column, an FID detector and a recorder/integrator. The column is an OV1701® from OHYO VALLEY (length 30 m, internal diameter 0.25 mm, film thickness 0.25 μm). The measurement is carried out isothermically at 180° C., the period of analysis is 25 min. The injector temperature is 250° C., detector: 250° C. In a 10 ml bottle, about 0.03 g of reference standard BHT (2,6-di-tert-butyl-4-methylphenol) is weighed in, then about 1 g resin and finished with about 6 g RP acetone. The response coefficient is determined by injecting a PTOP/BHT standard under the same dilution conditions.

Measurement of the Softening Point Value
This measurement is carried out according to standard E28-96 on an NBA 440® or NBA 430 device from the NORMALAB Company.

Operating Method for Examples 1 to 8 (Comparative) and Examples 9 to 11 (According to the Invention)
500 g para-tertiary octylphenol and possible X g of stearic acid (Table 1 gives the quantity of stearic acid added as a percentage of the PTOP introduced) and 2.1 g catalyst (sulfuric acid solution at 25% in isopropyl alcohol) is added to a 1 liter glass reactor equipped with a mechanical agitator and a refrigerant system in order to ensure an efficient reflux. The temperature of the medium is raised to 90° C. while agitating. The formaldehyde solution at 50% in water is maintained at 60° C. and then allowed to flow in over a period of 30 to 45 minutes, while regulating the flow of formaldehyde in such a way as to maintain a temperature of 100-110° C. in the reactor. When the formaldehyde is finished flowing in, the assembly is modified in order to permit the distillation of the reaction water. Then the temperature of the reaction medium is raised progressively toward 130-150° C. (T1 in Table 1) while distilling the water of the medium. This first phase lasts around one to two hours. The medium becomes thicker and foamy. When no more distillate remains, the temperature of the medium is raised progressively toward 150° C. while decreasing the pressure to 0.4 bar absolute to finish the removal of the water in the medium (i.e. the values T2 and P in Table 1). At the end of 20 minutes, 1.4 g of triethanolamine (diluted with 1.4 g of water) is introduced into the reactor, an aliquot sample is taken from the reactor in order to measure the softening point temperature. At this point, the resin is practically finished and does not advance more than 3 to 4° C. over several hours. When the desired softening point temperature is reached, the heating is stopped and the resin can leave the reactor for cooling, then analysis.

All the results are summarized in Table 1.

TABLE 1

| Ex. | Molar ratio (MR) | T1 (° C.) | T2/P (° C./bar) | Melt. pt. (° C.) | POP (%) | Stearic acid (%) |
|---|---|---|---|---|---|---|
| 1 | | 130 | 150/0.4 | | | 0 |
| 2 | 0.83 | 150 | 150/0.4 | 96 +2 h: 101 | 2.8 2.3 | 0 |
| 3 | 0.83 | 150 | 200/0.05* | 104.5 +3 h: 109 | 1.4 0.4 | 0 |
| 4 | 0.60 | 150 | 150/0.4 | 59 | 14 | 0 |
| 5 | 0.88 | 137 | 150/0.4 | 105 | 2.3 | 0 |
| 6 | 0.96 | 150 | 180/0.4 | 130 | 0.5 | 0 |
|   | 1.0 | 150 | ** | 110 +1 h: 118 | 1.3 0.8 | 0 |
| 8 | 1.2 | 150 | ** | 140 | 0.2% | 0 |
| 9 | 0.90 | 130 | 150/0.4 | 96 2 h/97 | 1.6% 1.4% | 5 |
| 10 | 0.93 | 130 | 150 | 95 +2 h 98 | 1.1% 0.95% | 7.5 |
| 11 | 0.96 | 130 | 150 | 102 +1 h 106 | 0.7% 0.7% | 7.5 |

*When the distillation of the residual PTOP is carried out, it is necessary to operate at an elevated vacuum and temperature conditions that are otherwise undesirable from an industrial point of view.
** The medium becomes too viscous and the step in a vacuum cannot be carried out without the risk of filling the reactor with the expanding resin. It is only possible to operate step 1 at atmospheric pressure then transfer the resin.

Examples 12, 13 and 14

Table 2

A mixture is made with fusion between a resin sold by Schenectady International, Inc. or CECA under the trade name R 7578P having a softening point value between 120 and 140° C. and a free PTOP content of less than 1% (novolac resin obtained by condensation of PTOP with formol) with different fatty acids indicated in Table 2. 120 g of resin are melted at 140° C., the fatty acid is then added, then the mixture is brought to 180° C. in order to ensure a homogeneous mixture within one to two hours.

TABLE 2

| | Resin R 7578P | | Fatty acid | Resin acc. to invention | |
|---|---|---|---|---|---|
| | PTOP ( ) | Melt. pt. | (%) | PTOP ( ) | Melt. Pt. |
| Example | % | (° C.) | Type | % | (° C.) |
| 12 | 0.6 | 125 | stearic 5.2 | 0.6 | 110 |
| 13 | 0.6 | 125 | stearic 8.0 | 0.6 | 103 |
| 14 | 0.6 | 123 | lauric 5 | 0.6 | 107 |

Example 15

Evaluation of the Tackifying Properties of the Resin from Example 11 in Comparison to a Commercial Resin Preparation of the Mixtures The resins according to the invention are introduced into a mixture for a sidewall with a height of 4 parts per cent of elastomer (pce) with polybutadiene (BR) base and polyisoprene (IR) according to the following composition:

- 60 pce of BR 1.4 cis sold by Bayer under the name Buna CB 10, non-staining, with viscosity ML (1+4) of 42-53 at 100° C. and of which the amount of 1.4 cis is 96%,
- 40 pce of IR 1.4 cis sold by GoodYear under the name Natsyn 2200 with viscosity ML(1+4) of 70-90 at 100° C.,
- 60 pce of carbon black sold by Degussa under the name Corax N550, with average diameter 47 m.c. and weight per surface area of 43 $m^2/g$,
- 5 pce of aromatic oil sold by BP under the name Enerdex 65 with density 0.984 at 20° C. and with viscosity 25.5 cSt ($mm^2/s$) at 100° C.,
- 5 pce stearic acid (activator),
- 5 pce zinc oxide,
- 2 pce anti-ozone and anti-aging protection agent (N-isopropyl-N'-phenyl-p-phenylene-diamine (IPPD)) sold by Bayer under the name Vulkanox 4010 NA by Bayer,
- 2 pce of Vulkanox 4020LG, anti-ozone and anti-aging protection agent N-(1,3-dimethyl butyl)-N'-phenyl-p-phenylene-diamine (6PPD) from Bayer,
- 4 pce of tackifying resin from Example 11 or tackifying alkylphenol/formol resin with melting point temperature of 102° C. sold by Schenectady International, Inc. or CECA under the trade name R 7521P,
- 1 pce insoluble sulfur (vulcanizing agent) sold by Flexys under the name Crystex OT20, containing 78% total sulfur, and
- 1.5 pce of N-cyclohexyl-2-benzothiazyl sulfonamide (CBS).

The base mixtures or master mixtures (non-accelerated mixtures) are prepared in a Banbury type internal mixer with 390 $cm^3$ capacity. It is important to note that the speed of the rotors, as well as the starting temperature have been determined in such a way that the dropping temperature of the mixture reaches at least 135° C. within a convenient time (10 min). The gum and half the oil and carbon black are introduced at the same time, then the resin is ground a second time with the rest of the oil and of the carbon black.

The mixtures are refrigerated immediately in a mixer with cold cylinders. After resting 24 h, the base mixtures are accelerated in the internal mixer. The initial temperature of the chamber is 50° C. and the speed of the rotors is 50 rpm. The mixing cycle is 6 minutes and the dropping is carried out at 100° C. to prevent any risk that the mixture will burn. The forming is then carried out on cylinders at 70° C. When the final mixtures are cooled, samples are cut off and stored protected from light and in an atmosphere with controlled temperature (23±2° C.) and humidity (53±3% rel. hum.). Storage is carried out in Petri boxes; the samples are placed on sheets of paper since they adhere quickly and strongly to glass.

Tack Measurement

This measurement is a measurement of traction on two disks of crude rubber in contact, and is carried out on an INSTRON dynamometer (model 5565), equipped with the control software described below. The tack measurement assembly diagram is shown in FIG. 1.

Circular samples (diameter 18 mm, thickness 2 mm) are glued to steel disks and put in place in the two mounting plates. The lower mounting plate is fastened and the upper is mobile and controlled by the control software. It lowers up to the application of a specific pressure Pc for a specific time tc, then it rises, measuring the force required to pull the two samples apart.

The profile measurement carried out by the control software is made up of five ramps:

$1^{st}$ ramp: Displacement of frame until Pc is reached (speed=5 mm/min), $2^{nd}$ ramp: Maintaining Pc for tc, $3^{rd}$ ramp: Raising the frame again at slow sped to return to a compression force zero. Variation in force of Pc+2N (speed=0.1 mm/min), $4^{th}$ ramp: Maintaining frame for 300 s, the rubber relaxes, the force is returned to zero, $5^{th}$ ramp: Raising of the frame at constant speed set at 2 mm/min.

Figure 2:
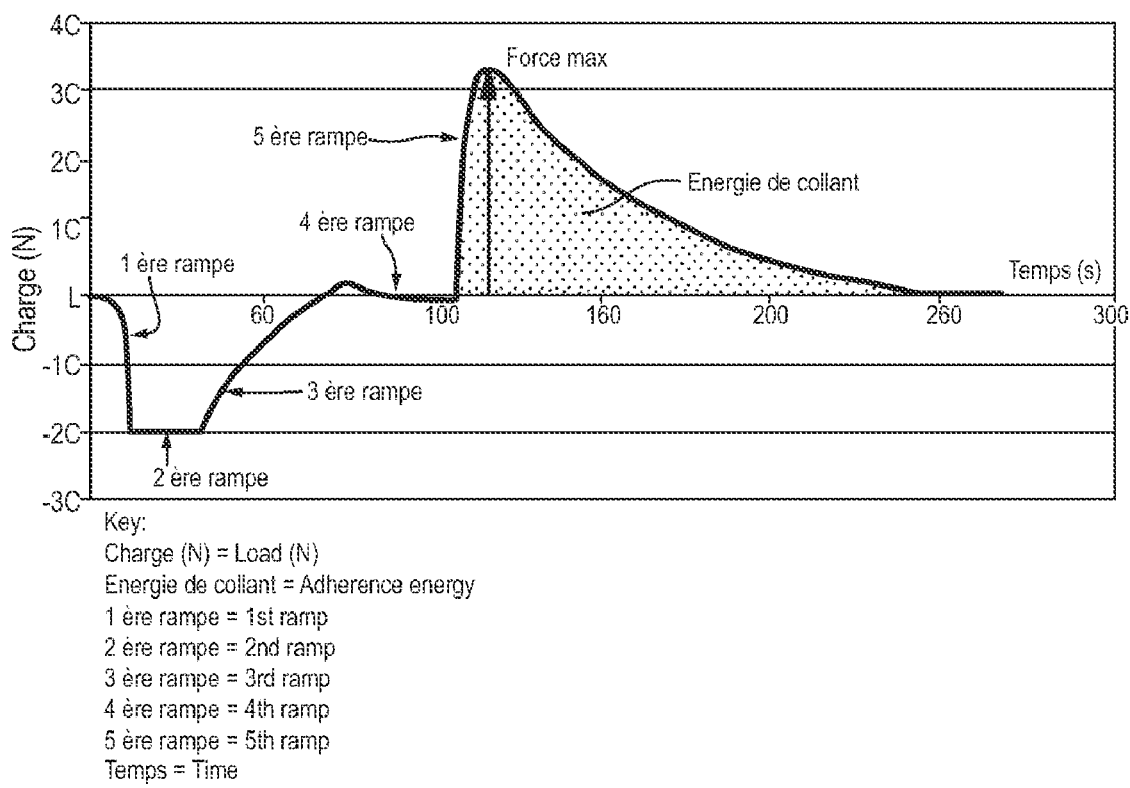
FIG. 2 is a graph illustrating the force as a function of displacement, time, and tack measurement.

During the entire cycle, the computer registers the force as a function of displacement, time, and tack measurement profile, as shown in FIG. 2. During the traction phase, the following significant values are recorded: the maximum traction force, and the area under the curve giving the force as a function of displacement, called adherence energy.

The conditions used for this manipulation are Pc=20 N and tc=20 x.

The tack measurements presented in Table 3 were carried out 1 day after acceleration.

TABLE 3

|  | R 7521P | Resin according to invention (Example 11) |
|---|---|---|
| Tack (mJ) | 68 ± 5 | 69 ± 5 |

The results show that the performance of this resin is at least as good as the standard resin with a comparable softening point temperature, e.g. the resin R 7521P sold by Schenectady International, Inc. or CECA that contains more than 3% free PTOP.

What is claimed is:

1. A novolac alkylphenol resin comprising 2-20% by weight, based on the weight of the alkylphenol, of at least one saturated or unsaturated fatty acid, wherein the resin has a rate of residual alkylphenol of less than 2% and a softening point temperature between 85-105° C.

2. The resin of claim 1, wherein the rate of residual alkylphenol is less than or equal to 1.5%.

3. The resin of claim 2, wherein the rate of residual alkylphenol is less than or equal to 1%.

4. The resin of claim 1, wherein the softening point temperature is between 95-105° C.

5. The resin of claim 1, wherein the amount of fatty acid ranges from 5-10% by weight, based on the weight of the alkylphenol.

6. The resins of claim 1, wherein the alkylphenols comprise phenols alkylated by a $C_6$-$C_{10}$ hydrocarbon in the para position of the phenol group.

7. The resin of claim 6, wherein the alkylphenol is paratertiary octylphenol.

8. The resin of claim 1, wherein up to 30% of the total mass of the phenols of the resin is selected from the group consisting of phenol, resorcinol, cardanol, dialkylphenols, xylenols 2,4-ditertiary octylphenol, 2,6-ditertiary octylphenol, and combinations thereof.

9. The resins of claim 1, wherein the fatty acid is a saturated mono-carboxylic acid or a mono-olefinic acid having at least 8 carbon atoms.

10. The resin of claim 9, wherein the fatty acid is a saturated fatty acids having 8 to 32 carbon atoms, or a synthetic or natural mixture of fatty acids obtained by saponification of vegetable oils or animal fats.

11. The resin of claim 10, wherein the fatty acid is stearic acid.

12. A process for preparing a novolac alkylphenol resin, comprising:
   (a) reacting an alkylphenol with an aldehyde to form a first resin, wherein the molar ratio of the alkylphenol:aldehyde is at least 0.9:1.0, and
   (b) mixing the first resin with from 2-20% by weight, base on the weight of the alkylphenol, of at least one saturated or unsaturated fatty acid in a melted state,
   to form a novolac alkylphenol resin, wherein the novolac alkylphenol resin has a residual alkylphenol of less than 2% and a softening point temperature between 85-105° C.

13. The method of claim 12, wherein the rate of residual alkylphenol is less than or equal to 1.5%.

14. The method of claim 13, wherein the rate of residual alkylphenol is less than or equal to 1%.

15. The method of claim 12, wherein the softening point temperature is between 95-105° C.

16. The method of claim 12, wherein the amount of fatty acid ranges from 5-10% by weight, based on the weight of the alkylphenol.

17. The process of claim 12, wherein the aldehyde comprises formol.

18. A process for the preparing a novolac alkylphenol resin, comprising condensing an aldehyde and an alkylphenol in the presence of from 2-20% by weight based on the weight of the alkylphenol, of at least one saturated or unsaturated fatty acid at a temperature of less than or equal to 200° C., to form a novolac alkylphenol resin,
   wherein the novolac alkylphenol resin has a residual alkylphenol of less than 2% and a softening point temperature between 85-105° C.

19. The method of claim 18, wherein the rate of residual alkylphenol is less than or equal to 1.5%.

20. The method of claim 19, wherein the rate of residual alkylphenol is less than or equal to 1%.

21. The method of claim 18, wherein the softening point temperature is between 95-105° C.

22. The method of claim 18, wherein the amount of fatty acid ranges from 5-10% by weight, based on the weight of the alkylphenol.

23. The process of claim 18, wherein the aldehyde comprises formol.

24. The process of claim 18, wherein the condensing temperature is less than or equal to 180° C.

25. The process of claim 24, wherein the temperature is less than or equal to 160° C.

26. The process of claim 18, wherein the process is conducted in a batch or continuous process.

\* \* \* \* \*